United States Patent [19]
Horbaschek et al.

[11] Patent Number: 5,479,468
[45] Date of Patent: Dec. 26, 1995

[54] X-RAY DIAGNOSTICS INSTALLATION

[75] Inventors: Heinz Horbaschek, Erlangen; Anton Nekovar, Neunkirchen, both of Germany

[73] Assignee: Siemens Aktiengesellschaft, Munich, Germany

[21] Appl. No.: 350,677

[22] Filed: Dec. 7, 1994

[30]       Foreign Application Priority Data

Dec. 16, 1993 [DE] Germany .................... 43 43 072.4

[51] Int. Cl.⁶ .................................................. H05G 1/64
[52] U.S. Cl. .................. 378/98.2; 378/98.7; 378/108
[58] Field of Search .................. 378/98.2, 98.7, 378/98.8, 108, 97

[56]             References Cited

U.S. PATENT DOCUMENTS 3,974,386  8/1976  Mistretta et al. ................... 378/108 X
3,996,420 12/1976  Geluk ...................................... 378/108
4,442,537  4/1984  Haendle et al. .
4,663,773  5/1987  Haendle .
4,980,905 12/1990  Meccariello ....................... 378/108 X
5,003,572  3/1991  Meccariello et al. ............... 378/108 X
5,091,925  2/1992  Haendle et al. ...................... 378/98.2
5,101,272  3/1992  Plut et al. ............................ 378/98.2
5,239,567  8/1993  Loonen .............................. 378/108 X

*Primary Examiner*—David P. Porta
*Attorney, Agent, or Firm*—Hill, Steadman & Simpson

[57]             ABSTRACT

An x-ray diagnostics installation has an operating voltage generator, an x-ray tube, an x-ray image intensifier, a video camera, a video amplifier having controllable gain, an integration circuit and a control circuit that acts on the operating voltage for dose rate control. The x-ray diagnostics installation is fashioned such that the control circuit is connected to the video amplifier and to the integration circuit and controls these components such that the gain of the video amplifier is raised when a limit value of the dose rate control is reached, with parameters of the integration circuit being simultaneously modified.

4 Claims, 2 Drawing Sheets

X-RAY DIAGNOSTICS INSTALLATION

BACKGROUND OF THE INVENTION

1. Field of the Invention

The invention is directed to an x-ray diagnostics installation of the type having an operating voltage generator, an x-ray tube, an x-ray image intensifier, a video camera, a video amplifier, an integration circuit and a control circuit that acts on the operating voltage generator for controlling the dose rate. In fluoroscopy mode, such x-ray diagnostics installations serve the purpose of reproducing x-ray images on a monitor.

2. Description of the Prior Art

German OS 31 19 751 discloses an x-ray diagnostics installation of the above type wherein a video pick-up device converts an image visible on the output luminescent screen of an x-ray image intensifier into an electrical signal that, is amplified, digitized by an analog-to-digital converter (A/D converter), and integrated in an image memory. A central control device generates all clock and control signals of the entire x-ray diagnostics installation. The control device effects control of the dose of the x-ray generator on the basis of a measured signal.

It is also known in x-ray diagnostics installations to undertake a gain control of the video pick-up device only when the range of control of the dose rate control is downwardly transgressed. When, however, the automatic gain control of the video amplifier takes effect, this means that only slight light, and thus a small signal are available. A disadvantage is that the signal-to-noise ratio (S/N) is thereby degraded.

SUMMARY OF THE INVENTION

An object of the present invention is to provide an x-ray diagnostics installation of the type initially cited that achieves an improvement of the signal-to-noise ratio (S/N) with a simple structure.

This object is inventively achieved in and x-ray diagnostics installation wherein the gain of the video amplifier is controllable and having a control circuit connected to the video amplifier and to the integration circuit which controls these components such that the gain of the video amplifier is elevated when a limit value of the dose rate control is reached, and wherein parameters of the integration circuit are modified at the same time.

As a result of a signal supplied from the operating voltage generator, a switch from dose control to automatic gain control of the video amplifier of the video camera can ensue in a simple way with a simultaneous increase in the integration, so that the signal-to-noise ratio (S/N) is improved. When the basic gain of the automatic gain control is reached again, the control circuit implements an answerback to the operating voltage generator for activating the dose rate control. It has proven advantageous when the integration is increased by lengthening the parameter of the integration time of the integration circuit. Given an x-ray diagnostics installation having an integration circuit that includes multiplication units wherein the current signal is multiplied by a first factor (1-k) and a preceding signal is multiplied by a second factor (k) as parameters, the factor (k) can be raised. An optimum matching can be achieved when the integration circuit has a characteristics memory for the factor (k).

DESCRIPTION OF THE PREFERRED EMBODIMENTS

Figure 1:
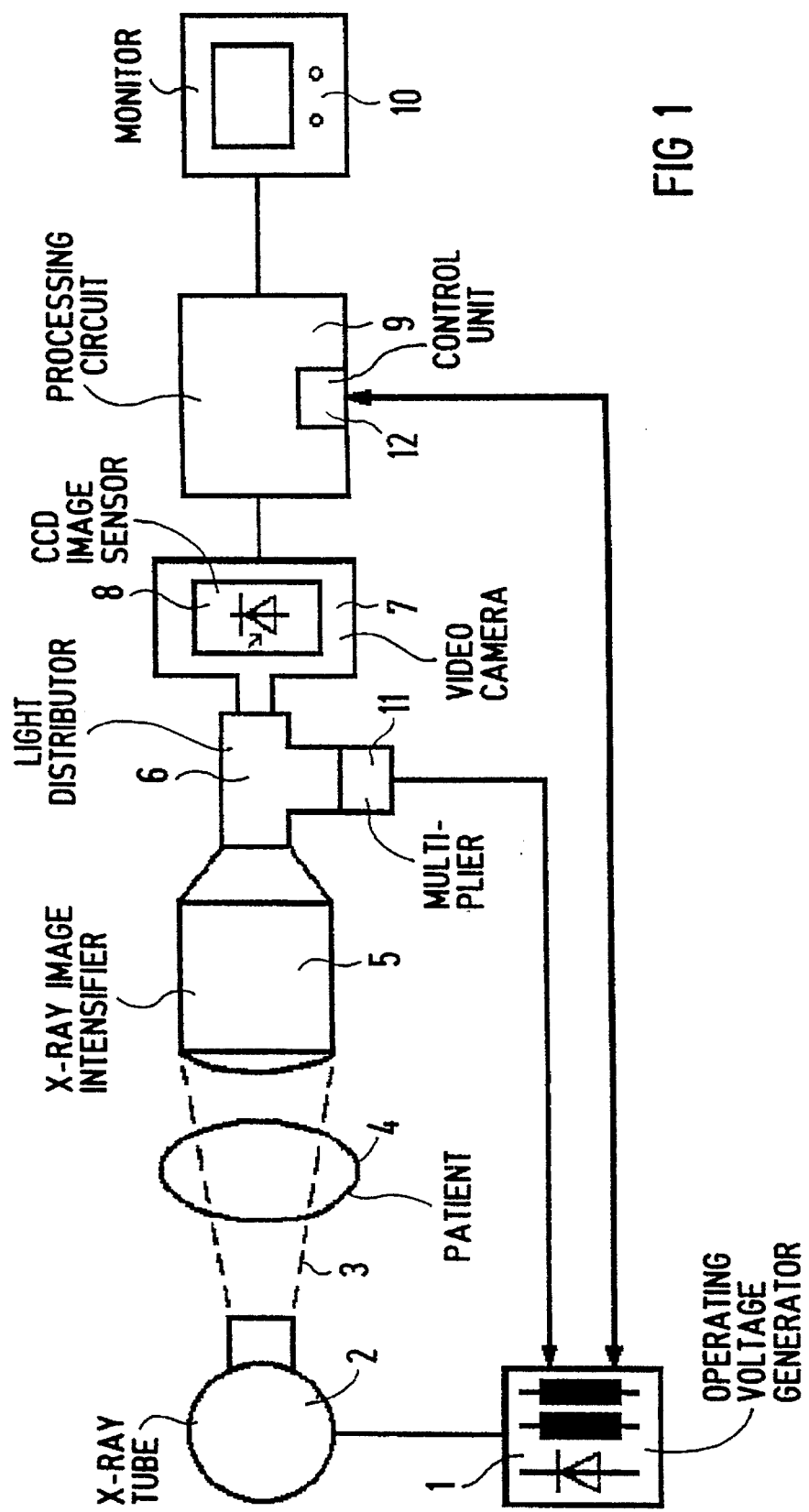
FIG. 1 is a block diagram of an x-ray diagnostics installation constructed in accordance with the principles of the present invention.

FIG. 1 shows an x-ray diagnostics installation having an x-ray tube 2 operated by an operating voltage generator 1. The x-ray tube 2 emits an x-ray beam 3 that penetrates a patient 4. The x-ray image attenuated by the patient 4 according to the patient's transparency is incident on the input luminescent screen of an x-ray image intensifier 5 that converts the latent x-ray image into a visible x-ray image. The visible x-ray image that has arisen on the output luminescent screen of the x-ray image intensifier 5 is registered by a video camera 7 via a light distributor 6. The video camera 7 can contain a CCD image sensor 8. The output of the video camera 7 is connected to a processing circuit 9 that is connected to a monitor 10 for the playback of the x-ray image.

For dose rate control of the x-ray generator 1, either a multiplier 11 is coupled to the light distributor 6 or a signal acquisition from the video signal of the video camera 7 ensues with a control unit 12 arranged in the processing circuit 9, this simultaneously serving as an actual value acquisition for the automatic gain control. The control unit 12 is connected to the operating voltage generator I for control and regulation thereof.

Figure 2:
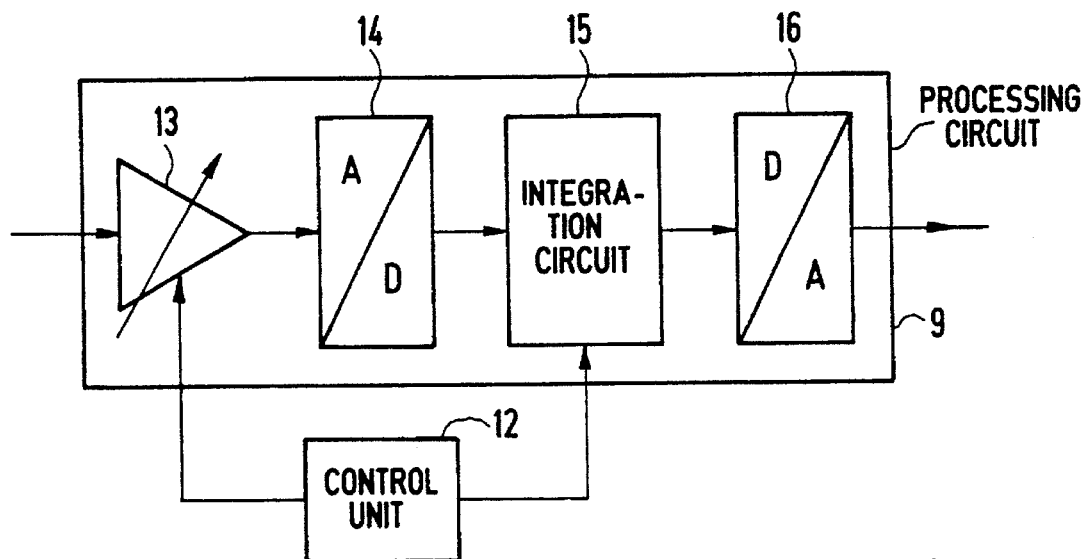
FIG. 2 is a block diagram showing details of the processing circuit of FIG. 1.

As shown, for example, in FIG. 2, the processing circuit 9 includes a controllable video amplifier 13, an analog-to-digital converter (A/D converter) 14, a following integration circuit 15 (yet to be described) and a digital-to-analog converter (D/A converter) 16. The video amplifier 13 and the integration circuit 15 are connected to the control unit 12.

Figure 3:
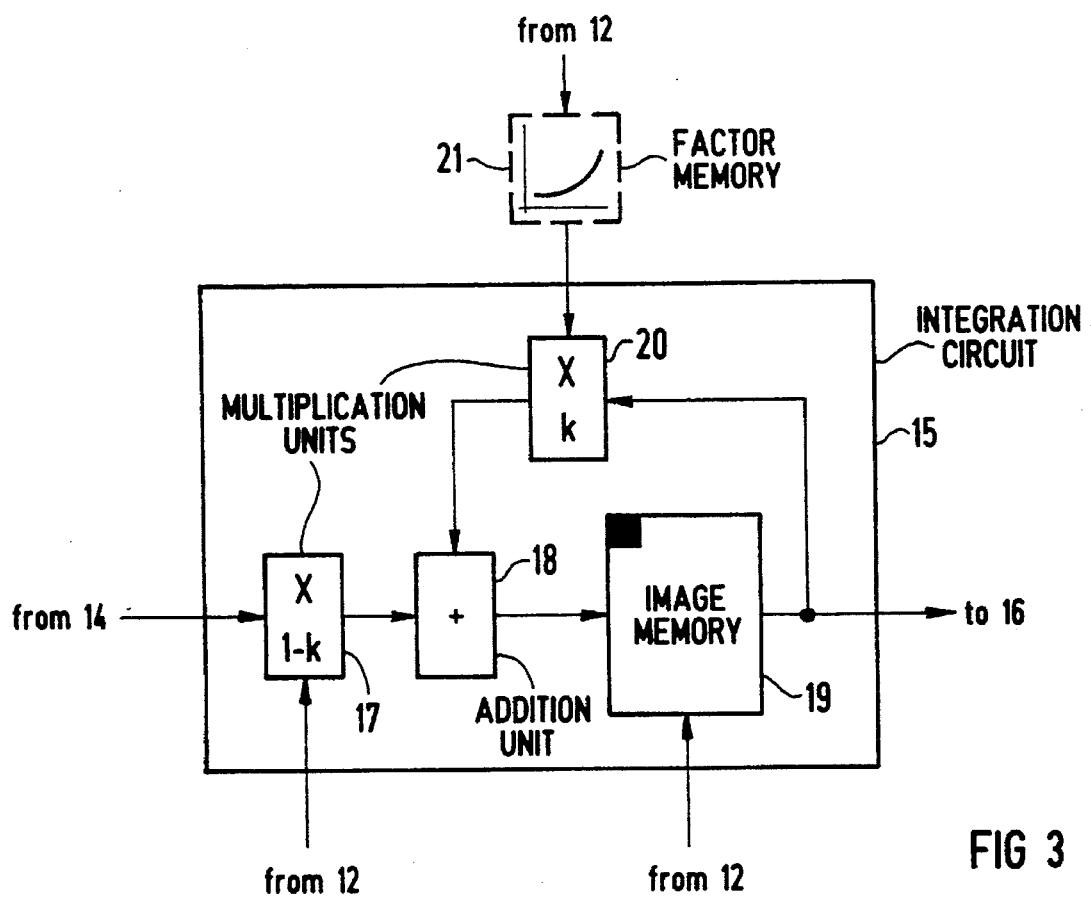
FIG. 3 is a block diagram showing details of the integration circuit in FIG. 2.

The integration circuit 15 has the structure shown in FIG. 3 and known, for example, from German OS 34 26 830. The current video signal is multiplied by a factor 1-k in a first multiplication unit 17. The output of the multiplication unit 17 is connected to an addition unit 18 that is connected to an image memory 19. The output of the image memory 19 is fed back via a second multiplication unit 20 to the second input of the addition unit 18. In the second multiplication unit 20, the stored signal is multiplied by a factor k. When a small factor k is by the control unit 12 set, a large part of the current video signal is added to a small part of the stored video signal, so that only a slight degree of integration ensues. The noise part is high and no motion blurring occurs.

When a high factor k is set by the control unit 12, then a small part of the current video signal is added to a large part of the stored video signal, so that a high degree of integration ensues. The noise part is low and motion blurring occurs.

The x-ray diagnostics installation is then controlled such that control of the dose rate is implemented via the operating voltage generator 1 during normal operation given an adequate illumination of the video camera 7. When a limit of the dose rate control is then reached because, for example, a fat patient 4 attenuates the x-ray beam to such an extent that only little light is incident onto the video camera 7, then an automatic gain control (AGC) is implemented by modifying the degree of amplification of the video amplifier 13. The signal-to-noise ratio (S/N) that is already poor, would thereby be further reduced.

In order to avoid this unwanted result, however, the filter effect of the integration circuit is raised simultaneously with the AGC for compensation, in accordance with the invention. This is achieved by raising the factor k that can be incremented according to a characteristic curve or table stored in a factor memory 21, with one of the stored valves being selected by the control unit 12. The signal-to-noise ratio (S/N) is boosted by the higher integration effect.

The modification of the integration factor can also be automatically derived from the amplitude of the video signal. Likewise, the parameters of an integration circuit can be controlled by a motion detector.

Although modifications and changes may be suggested by those skilled in the art, it is the intention of the inventors to embody within the patent warranted hereon all changes and modifications as reasonably and properly come within the scope of their contribution to the art.

We claim as our invention:

1. An x-ray diagnostics installation comprising:

an x-ray tube which emits an x-ray beam;

an operating voltage generator which supplies operating voltages to said x-ray tube for defining a dose rate;

an x-ray image intensifier disposed for registering an x-ray image produced by said x-ray beam on an input screen thereof, and for converting said x-ray image into a light image on an output screen thereof;

video means for processing said light image and displaying said light image, including a video camera coupled to said output screen of said x-ray image intensifier, a video amplifier connected to an output of the video camera and having a controllable gain, and an integration circuit connected to an output of said video amplifier and having an integration parameter; and control means connected to said operating voltage generator for controlling said operating voltage generator for controlling said dose rate and connected to said video amplifier and to said integration circuit for controlling said gain of said video amplifier and said integration parameter by increasing said gain when a limit value of said dose rate is reached and simultaneously modifying said integration parameter.

2. An x-ray diagnostics installation as claimed in claim I wherein said integration circuit comprises an integration circuit having an integration time comprising said integration parameter, and wherein said control means comprises means for simultaneously modifying said gain of said video amplifier and said integration time.

3. An x-ray diagnostics installation as claimed in claim 1 wherein said integration circuit comprises:

first multiplication means for multiplying a current output signal from said video amplifier by a first factor;

memory means for storing a preceding signal from said video amplifier which precedes said current signal; and second multiplier means for multiplying said preceding signal by a second factor, said second factor comprising said integration parameter; and wherein said control means comprises means for increasing said second factor simultaneously with increasing said gain of said video amplifier.

4. An x-ray diagnostics installation as claimed in claim 3 further comprising factor memory means for storing a plurality of different second factors, and wherein said control means comprises means for modifying said second factor simultaneously with increasing said gain of said video amplifier by selecting one of said plurality of second factors from said factor memory means.

* * * * *